March 9, 1937.  H. B. LAWTON  2,073,110
AIR CONDITIONING APPARATUS
Filed May 22, 1935  5 Sheets-Sheet 3
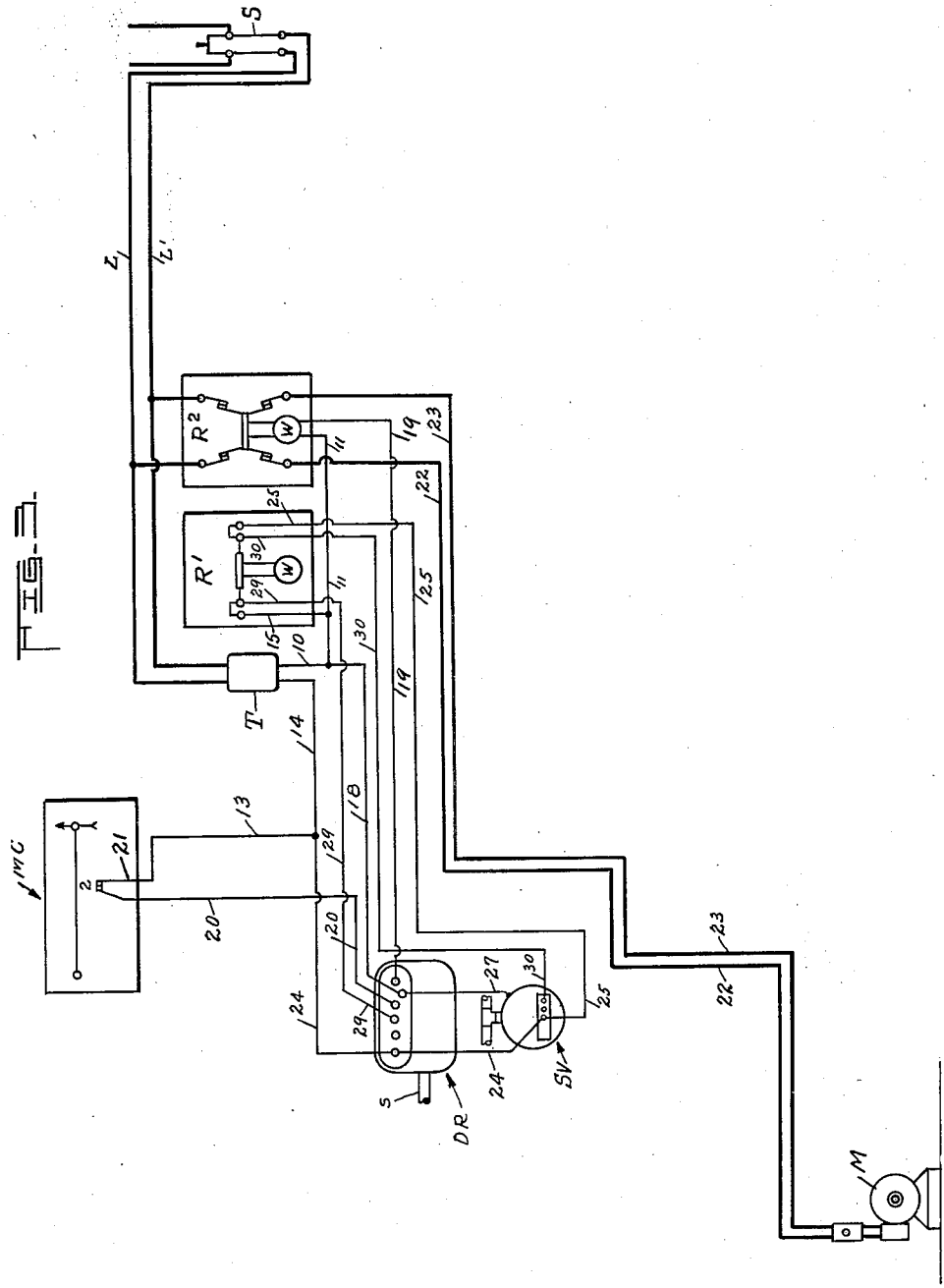
INVENTOR.
HARVEY B. LAWTON
BY
ATTORNEY.

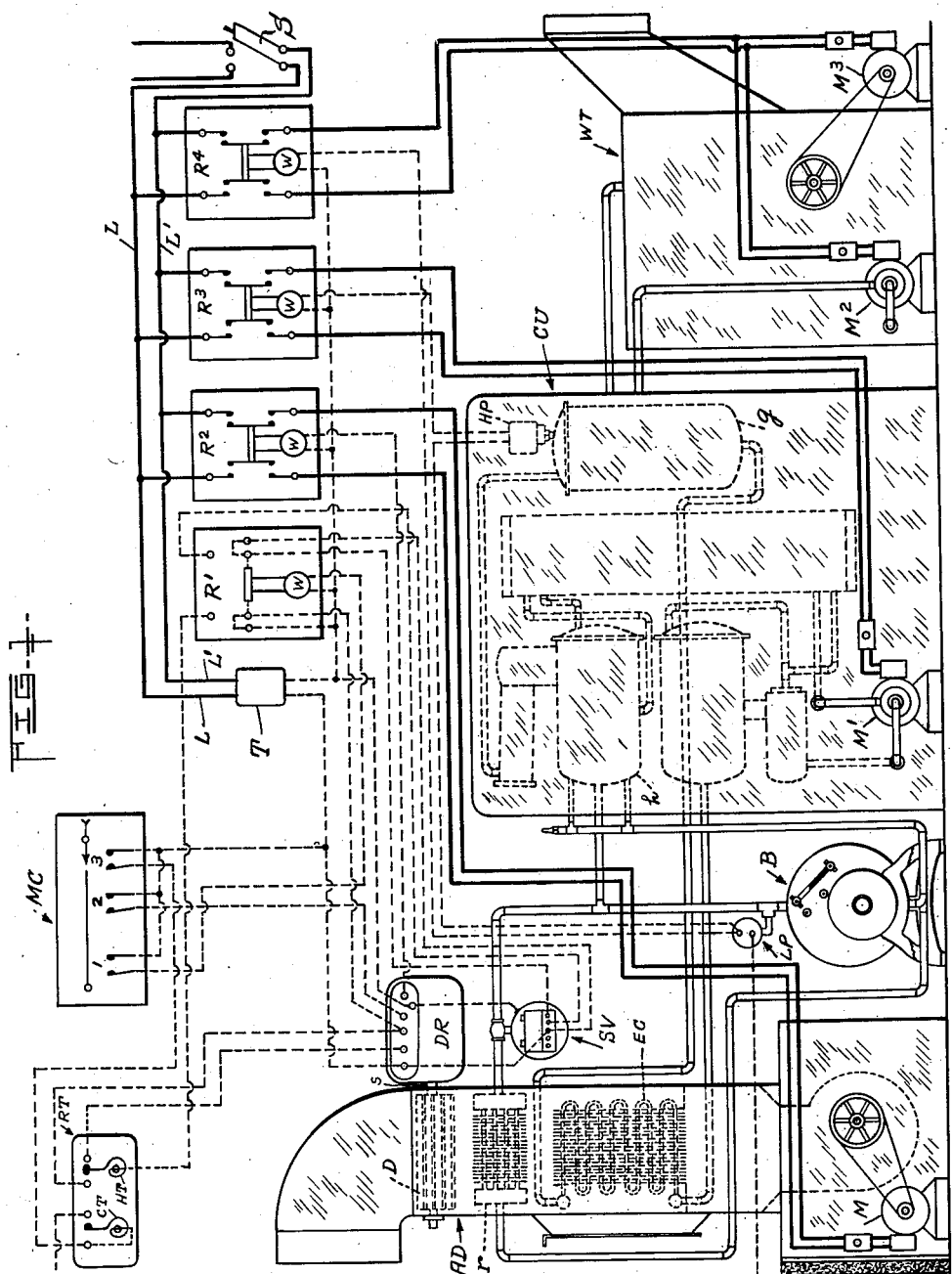

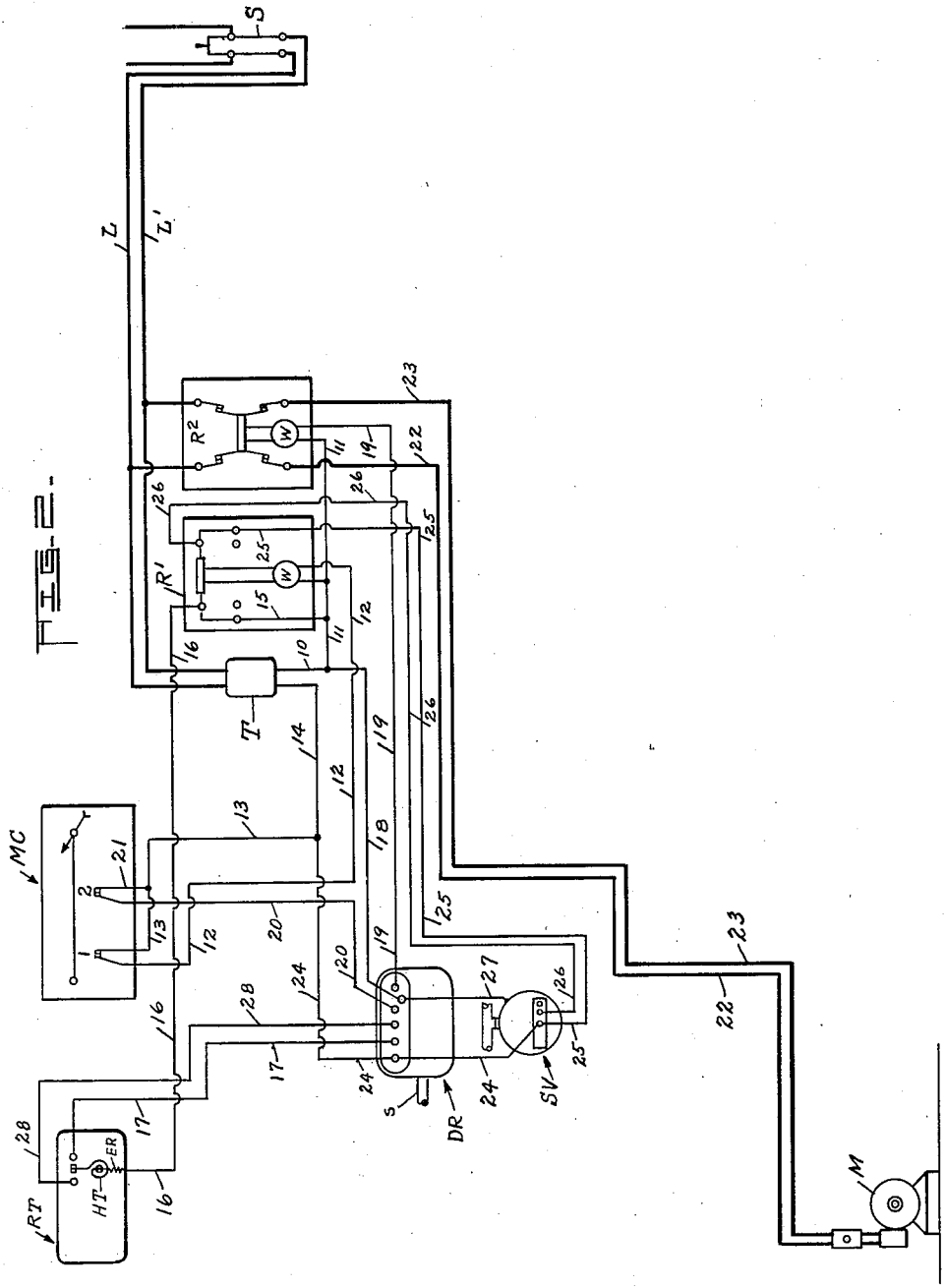

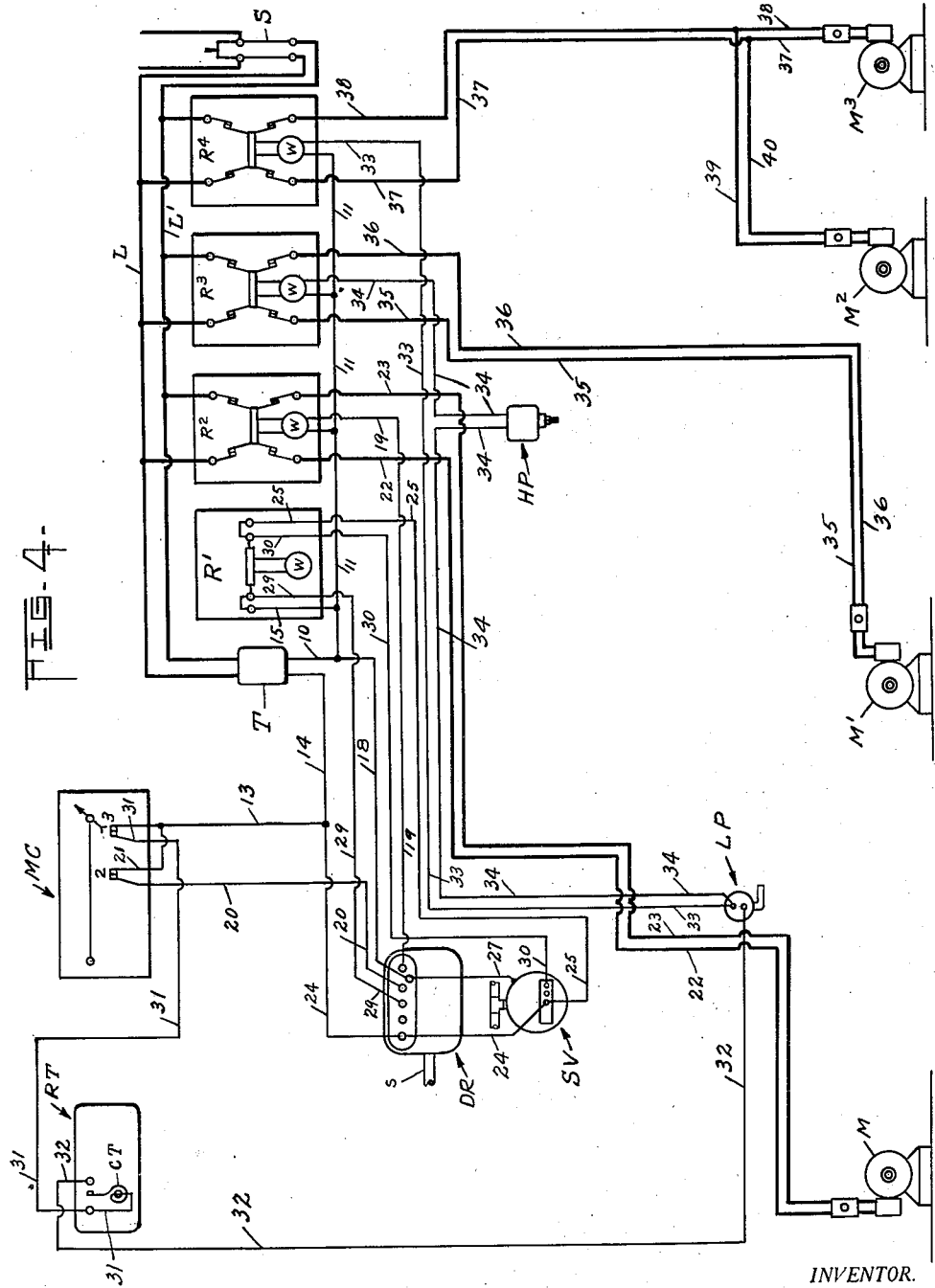

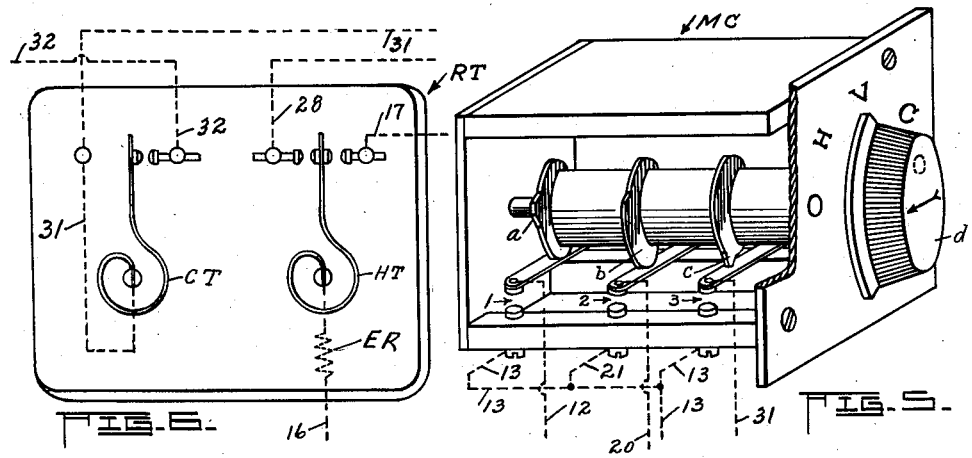
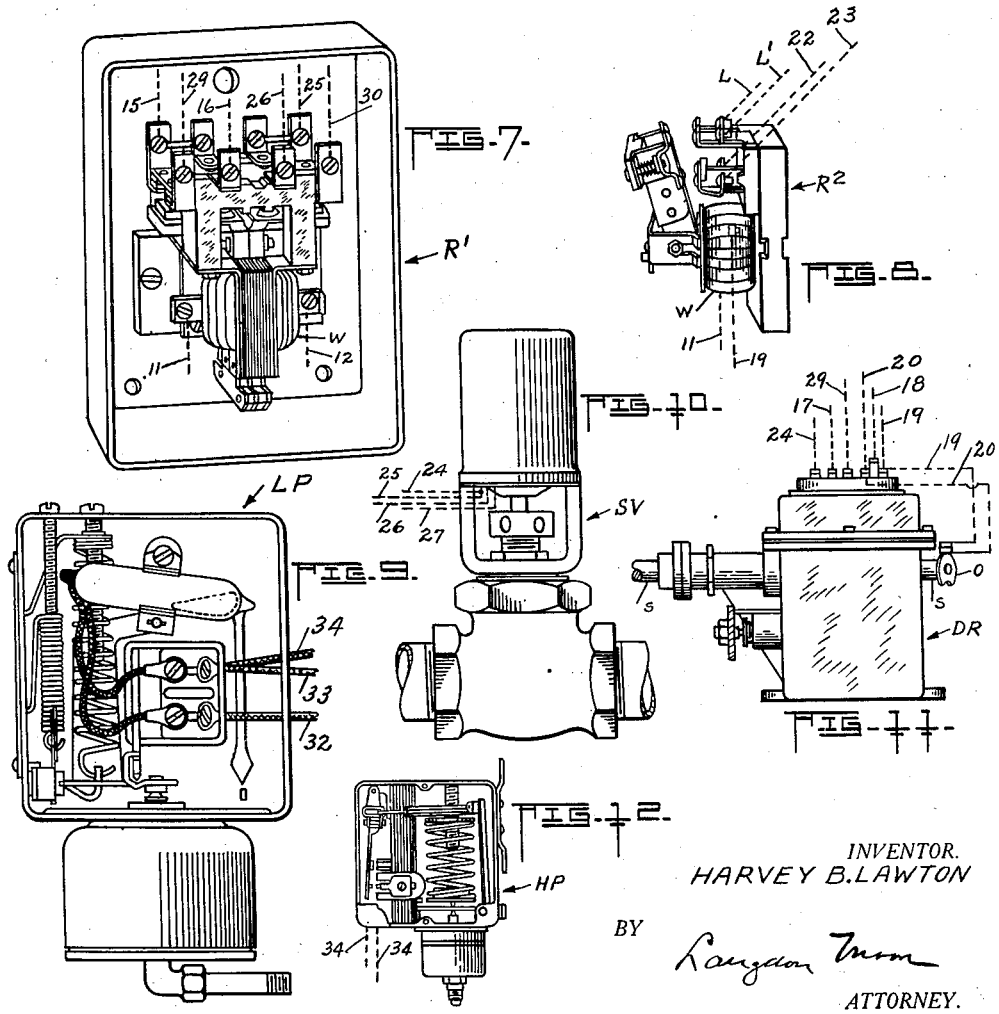

Patented Mar. 9, 1937

2,073,110

UNITED STATES PATENT OFFICE 2,073,110

AIR CONDITIONING APPARATUS

Harvey B. Lawton, Bloomington, Ill., assignor to Williams Oil-O-Matic Heating Corporation, Bloomington, Ill., a corporation of Illinois Application May 22, 1935, Serial No. 22,830

7 Claims. (Cl. 257—3)

This invention relates to improvements in air conditioning apparatus and more particularly to the means for controlling the operation thereof.

It is an object of this invention to provide a manual control for the air conditioning apparatus which may be located at a distance from said apparatus and wherever convenient preferably in the space to be air conditioned and which will provide automatically the circulation of various forms of conditioned air in accordance with the setting of the manual control. It is a further object of this invention to provide a manual control with three separate and distinct operating positions, one, for automatically circulating heated air as long as it is desired to increase the temperature and maintain a predetermined degree of temperature within the space to be air conditioned, another, to continuously circulate air at outside temperature when it is desired to ventilate the space to be air conditioned, and a third, to automatically circulate cool air as long as it is desired to reduce the temperature and maintain a predetermined degree of temperature within the space to be air conditioned irrespective of the outside atmospheric temperature. With these and other objects in view, reference is made to the accompanying sheets of drawings which illustrate a preferred form of this invention with the understanding that minor changes may be made therein without departing from the scope thereof.

Figure 1 is a diagrammatical view of a preferred form of air conditioning apparatus with a schematic wiring diagram of the various controls embodied in this invention.

Figure 2 is a schematic wiring diagram illustrating the circuits closed when the manual switch has been moved to the position to circulate heated air to automatically maintain a predetermined temperature in the space to be air conditioned.

Figure 3 is a schematic wiring diagram illustrating the circuits closed when the manual control has been moved to the second position to ventilate the space to be air conditioned.

Figure 4 is a schematic wiring diagram illustrating the circuits closed when the manual control has been moved to the third position to automatically circulate cool air through the space to be air conditioned and maintain the temperature thereof at a predetermined degree.

Figure 5 is a detail perspective view of the manual control with parts broken away and parts removed to illustrate the operation of the switches controlling the respective circuits illustrated in Figures 2, 3, and 4.

Figure 6 is a perspective view of the thermostats for automatically controlling the heating or cooling of the air within the space to be air conditioned with the cover thereof removed.

Figure 7 is a view in perspective of the relay adapted to be energized by the manual control to close the circuit through the room thermostat when it is desired to automatically maintain an increased temperature in the space to be air conditioned, with the cover removed.

Figure 8 is a detached detail perspective view of one of the three similar relays actuated by the manual control for closing the respective circuits to the respective motors for operating respective elements of the air conditioning apparatus.

Figure 9 is a view in side elevation, with the cover removed, of the low pressure steam safety cut-out forming a part of the circuits closed when the manual control is set to automatically maintain a predetermined temperature within the space to be air conditioned below that of the exterior atmospheric temperature.

Figure 10 is a detail view in side elevation of an electrically operated steam valve adapted to be actuated by the manual control.

Figure 11 is a view partly in side elevation and partly diagrammatical of an electrically operated control for automatically actuating dampers and controlling the output of the air conditioning apparatus.

Figure 12 is a detail view in side elevation with the cover removed of the high pressure safety cut-out, placed in circuit only when the manual control is set to circulate cooled air within the space to be air conditioned, responsive to pressures within the cooling element.

Referring to the diagrammatical view and schematic wiring diagram shown in Figure 1, the wires L and L' lead from the commercial line through the hand switch S to a transformer T and through relay-operated switches $R^2$, $R^3$, and $R^4$, adapted, when closed, to connect the motors M, M', $M^2$, and $M^3$ in parallel with said commercial circuit, as illustrated in full black lines upon the drawings.

Manual control MC, as shown in detail in Figure 5, contains three switches 1, 2, and 3, in which the cams $a$, $b$, and $c$, are arranged upon the shaft rotated by the external knob $d$ to allow the three switches to open when the knob has been turned so that the arrow thereon indicates either of the positions marked by the diametrically opposite "O's" appearing on the flush plate of the switch box. When the knob has been rotated to cause the arrow to indicate the position marked by "H", the cams $a$ and $b$ close switches 1 and 2; when the arrow indicates "V", the switch 1 is opened by cam $a$, the switch 2 continues in the closed position; and when the arrow indicates "C", the switch 2 is closed and 1 is opened and the cam $c$ closes switch 3. The switches 1, 2, and 3 are connected in the secondary circuit of the transformer T, indicated by dotted lines in Figure 1, as will be hereinafter described.

The dual thermostat RT, as shown in detail in Figure 6, is a commercial article and mounts two thermostats. The one marked HT is adapted to be connected in the secondary circuit to control the supply of heat to the space to be air conditioned and controls two circuits indicated by the dotted lines, as will be hereinafter described. The other marked CT is also adapted to be connected in the secondary circuit to assist in controlling the circulation of cool air within the space to be air conditioned, as will be hereinafter described.

The relay R', illustrated in detail in Figure 7, is a commercial double-pole double-throw relay and includes a coil, the windings $w$ of which are adapted to be connected in the secondary circuit, as indicated by the dotted lines in Figure 1, and is so constructed when energized to close one circuit and when deenergized to close another circuit, as will be hereinafter described.

The relays $R^2$, $R^3$, and $R^4$ are also commercial articles, one of which is illustrated in detail in Figure 8. Each of these relays includes a coil, the windings $w$ of which are adapted to be connected in the secondary circuit, as indicated by the dotted lines in Figure 1, and when energized, will close the circuits from the respective motors M, M', $M^2$ and $M^3$ to the commercial line, shown in full lines in Figure 1, as will be hereinafter described.

Before describing the other controls forming a part of this improved control system, it is necessary to describe the various units included in the air conditioning apparatus in order to understand their operation.

A cooling unit CU is shown in Figure 1 enclosed within a casing and may be of any commercial type, but it is preferable to employ an absorption type refrigerating apparatus, as disclosed in detail and described in the application of Glenn F. Zellhoefer, Serial No. 736,232, filed July 20, 1934, and some of the various elements of which are indicated in dotted lines within the cover of the cooling unit CU. The cooling unit, be it of the compression type or absorption type, is operated by a motor M' for operating the compressor or the pump for circulating the solution, in accordance with the type of refrigeration apparatus, which is adapted to be connected in the line circuit through the relay $R^3$, as indicated in full lines in Figure 1 of the drawings and in either type the cooling unit CU acts to reduce the temperature of the air surrounding or passing through an evaporator coil EC, illustrated in dotted lines as located within the air distribution unit AD, as will be hereinafter described. As an absorption type of cooling unit is illustrated, it is necessary to provide a boiler B of any commercial design, although it is preferable to employ a boiler-burner unit such as disclosed in the Patent No. 1,991,186, granted Walter W. Williams, February 12, 1935. The steam from the boiler is applied not only to distill the gaseous refrigerant from the solution in the heater or generator $h$ forming a part of the absorption type cooling unit CU, but also to a radiator $r$ located within the air distribution unit AD. The condenser $g$ for containing the gaseous refrigerant in the cooling unit CU is connected to the high pressure cut-out HP illustrated in detail in Figure 12. This device is a commercial article and is actuated by the pressure within the condenser $g$ to open a switch in the secondary circuit indicated in dotted lines of Figure 1, as will be hereinafter described, when the pressure within the condenser $g$ reaches a predetermined high degree, and when the pressure decreases below said degree will allow the switch to close and the circuit to remain closed.

In an absorption type of refrigerating machine, it is necessary to circulate a cooling fluid through the absorber and condenser to maintain the proper temperatures within these and perhaps other elements in a manner well known to the art. In the present instance, a water-cooling tower WT is provided which is of any commercial construction and, therefore, does not need detailed description except a statement that a pump operated by a motor $M^2$ is provided for circulating the cooling fluid through the cooling unit, and a fan blower, not shown, operated by a motor $M^3$, which are connected in parallel to the relay $R^4$, as indicated in full lines in Figure 1, as will be hereinafter described.

The air distributing unit AD includes an elongated vertical casing, as shown in Figure 1, which is adapted to be connected at its upper end with the space to be air conditioned and its lower end connected to a circulating fan, not shown, adapted to circulate air, from an intake I through the unit for circulation in the space to be air conditioned, in which the fan is operated by a motor M connected to the relay $R^2$, as indicated in full lines in Figure 1, as will be hereinafter described. The evaporator coil EC is mounted in the path of the air circulated by the operation of the motor M and the radiator coil $r$ is mounted thereabove. A damper D is preferably mounted in the air distributing unit above the radiator coil $r$, which damper is operated to open and close by a damper regulator DR, shown in detail in Figure 11 of the drawings. The steam from the boiler B to the radiator $r$ is controlled by an electrically operated steam valve SV, shown in detail in Figure 10 of the drawings. The steam pipe leading from the boiler to both the heater $h$ of the cooling unit CU and the steam valve SV is in communication with a low pressure cut-out LP which is mounted on the steam pipe adjacent the boiler, as shown in Figure 1, said low-pressure cut-out being illustrated in detail in Figure 9 of the drawings.

The low pressure cut-out LP, the steam valve SV, and the draft regulator DR are all commercial articles. In the low pressure cut-out, as shown in detail in Figure 9, the normal commercial article has been slightly changed to meet the needs of this application by reversing the position of the mercury tube in the switch control thereby, so that when the steam pressure within the boiler B drops below a predetermined degree, the circuit to the switch is opened, as shown in Figure 9, and when the pressure reaches the predetermined degree, the switch is closed to continue the circuits therethrough. As shown in dotted lines, in Figure 1, one terminal of the switch of the low pressure cut-out LP is connected in the secondary circuit to the thermostat CT and the outer terminal of the switch is connected, as shown by dotted lines in the secondary circuit, to the relays R³ and R⁴, which relays control the operation of the motors M', M², and M³, as will be hereinafter described.

The steam valve SV, illustrated in detail in Figure 10, is a commercial type and the valve is opened and closed by a small reversing electric motor connected in the secondary circuit, as shown by the dotted lines in Figure 1, to the relay R', which, in turn, is controlled by the manual switch, as hereinafter described.

The draft regulator DR, shown in detail in Figure 11, is also of commercial form and contains a small reversing electric motor adapted to rotate a shaft $s$ controlling the operation of the damper D within the air distributing unit AD. This motor is connected in the secondary circuit, as shown in dotted lines in Figure 1 and is adapted to be controlled by the thermostat HT of the room thermostat RT when it is desired to increase the temperature of the space to be air conditioned and by the switch 2 of the manual control MC. An additional switch has been applied to this commercial device by affixing an operating cam $o$ upon the shaft $s$ to be opened as long as the damper is closed and to be closed as long as the damper is open by the position of the cam upon the shaft, which switch is connected in secondary circuit, as shown in dotted lines of Figure 1, to the relay R², and to the switch 2 of the manual control MC.

When the manual control knob has been turned to either one of the off-positions indicated by the arrow pointing to one of the letters "O" upon the flush plate of the switch box, the switches 1, 2, and 3 are opened and all of the circuits are inoperative, as indicated in Figure 1 of the drawings. When the manual control MC has been rotated so that the arrow is in line with the letter "H" on the outer side of the casing, the air conditioning apparatus will act as a heating unit and supply warm air to the space to be air conditioned until a predetermined temperature has been reached and then automatically maintain the temperature through the thermostat HT of the room thermostat RT. This thermostat is placed wherever convenient, preferably within the space to be air conditioned.

The circuits closed through switches 1 and 2 for heating purposes are shown in the wiring diagram on Figure 2. In this figure the units of the air conditioning apparatus are omitted, and only the controls placed in circuit by this setting of the manual control MC are shown.

The closing of switch 1 closes the secondary to the transformer by wires 10, 11 through windings $w$ of the relay R', and by wire 12 through the closed switch 1, and by wires 13 and 14 to the transformer T. This energizes the relay R' and causes it to close the circuit through wire 15 leading from wire 11 to wire 16 connected to the movable arm of the thermostat HT, which, when calling for heat, will close the circuit through wire 17 to the reversing motor of the draft regulator DR, to open the damper in the heat distributor unit AD, which is connected to the wire 18 leading from wire 10 of the transformer. The rotation of the shaft $s$ of the damper regulator causes the cam $o$ thereon, see Figure 11, to close the circuit between the wire 11 leading through the winding $w$ of the relay R² to the wire 19 through said switch to wire 20 and through closed switch 2 and wire 21 to wire 13 joining wire 14 from the transformer. The energizing of relay R² closes the line circuit through wires 22 and 23 to the motor M to operate the circulating fan in the air distribution unit. At the same time, the secondary circuit is closed through the wire 14 of the transformer and extension 24 thereof to one pole of the reversing motor of the steam valve SV and thence by wire 25 through the connection made by the energized relay R' to the wire 26 and by wire 26 to the other pole of the reversing motor and through the ground upon the casing of the switch SV to wire 27 forming an extension of wire 18 returning to the transformer through wire 10, causing the motor to open the steam valve to supply heat to the radiator $r$ in the air distribution unit. The operation of the circulating fan forces air through the air distributing unit over the heated coil for circulation within the space to be air conditioned.

When the temperature has been raised in this space to the predetermined degree, the thermostat HT breaks contact with the wire 17 and closes the secondary circuit through wire 28 to the reversing motor of the draft regulator and through the ground within the draft regulator casing to the wire 18 returning to the transformer by way of wire 10, which thereby reverses the operation of the shaft $s$ and closes the damper D in the air distributing unit while the steam valve remains open and the circulating fan remains in operation, so that as soon as the temperature within the space drops below the predetermined degree the thermostat HT will break the circuit just described and closes the circuit heretofore described, which will operate the damper to open and supply heated air to the space to be air conditioned.

When it is desired to furnish ventilation by circulating air at outside atmospheric temperature, the knob of the manual control MC is rotated so that the arrow points to the letter "V" upon the flush plate of the switch box. This movement opens switch 1 while allowing switch 2 to remain closed, as shown in Figure 3. The opening of switch 1 opens the secondary circuit through the windings of the relay R', thereby causing the relay to open the circuits between wires 15 and 16 and wires 25 and 26 and closes the circuits between wire 15 and wire 29 and wire 25 and wire 30. Closing the circuit to wire 29 closes the circuit from the transformer through wires 10, 15 to the reversing motor of the draft regulator DR to wire 20 and back through closed switch 2 and wires 21, 13 and 14 to transformer, causing the motor to operate in reversed direction to open the damper in the air distribution unit AD, and at the same time, the closing of the circuit between wires 25 and 30 establishes a circuit through wire 24 extending from wire 14 to the transformer to wire 25 in the steam valve SV and from wire 25 through the closed switch R' to wire 30 and by wire 30 to the other pole of the reversing motor of the steam valve and ground within the casing SV, the wire 17 leading through wire 18 by the way of wire 10 back to the transformer. This energizes the steam valve motor to close the steam valve. The windings $w$ of the relay R² are maintained energized, as heretofore described, through closed switch 2 so that in this position the circulating fan only is operating with the steam valve cut off and the damper wide open in the air distributing unit. All of the above is clearly illustrated in the wiring diagram of Figure 3 of the drawings.

When it is desired to cool the space to be air conditioned, the knob of the manual switch MC is rotated so that the arrow points to the letter "C" upon the flush plate of the switch box. This movement closes switch 3 and allows switch 2 to remain closed, as shown in Figure 4. The closing of switch 3 closes a circuit from the transformer T through wires 14 and 13, through switch 3 and by wire 31 to the movable arm of the thermostat CT of the dual thermostat RT. When the temperature of the space to be cooled is above the predetermined degree to which the thermostat CT is set, the thermostat CT closes a circuit from wire 31 through wire 32 to the low pressure cut-out LP. The circuit continues through the low pressure cut-out LP by way of wire 33 and windings $w$ of the relay $R^4$ and back by the way of wires 11 and 10 to the transformer T and at the same time the circuit is completed from the low pressure cut-out LP by wire 34 which passes through the high pressure cut-out HP and thence to the windings $w$ of the relay $R^3$ and back by wires 11 and 10 to the transformer. The closing of the circuit through relays $R^3$ and $R^4$ actuates them to close the circuit from the commercial current LL' through wires 35 and 36 to the motor M' and by wires 37 and 38 to the motor $M^3$, motor $M^2$ being connected in parallel with wires 37 and 38 by wires 39 and 40.

Switch 2 being closed, the damper D remains open and the steam valve SV remains closed and the motor M remains in the commercial circuit. If at any time while the thermostat CT closes the circuit between wires 31 and 32, should the pressure of steam within the boiler B drop below that necessary for the proper operation of the cooling unit CU, the low pressure cut-out LP will break the circuit from wire 32 to wires 33 and 34, thereby deenergizing relays $R^3$ and $R^4$, breaking the circuit from the commercial line to the motors M', $M^2$, and $M^3$, and as soon as the steam pressure within the boiler B returns to its normal pressure, the low pressure cut-out LP will close the circuit from wire 32 to wires 33 and 34 to again place the motors M', $M^2$, and $M^3$ in circuit with the commercial line. If during the operation of the cooling unit CU, the pressure within the condenser $g$ thereof is increased beyond the normal operating pressure, the high pressure cut-out HP will break the circuit through the wire 34 and thereby open the circuit to the relay $R^3$, which will open the circuit from the commercial line to the motor M' and the cooling unit CU ceases to operate as such. In this instance, the current continues to pass through wire 33 and continues the circuit from the commercial line through motors $M^2$ and $M^3$, which merely circulate the cooling water through the cooling unit. As soon as the pressure within the condenser $g$ returns to normal, the circuit will be closed by high pressure cut-out HP and the motor M will be caused to again operate.

As aforesaid, the draft regulator DR is of commercial form and contains a small reversing electric motor adapted to rotate the shaft $s$ controlling the operation of the damper D. The type of commercial draft regulators here shown usually includes a lag in the operating mechanism between the motor and the shaft so that it is preferable to employ a proportioning thermostat for controlling the operation of the motor to prevent an overrun, and for that reason, the thermostat HT of the room thermostat RT is provided with an electrical resistance ER adjacent to the coil of the thermostat, as shown in Figure 6, in the circuit completed through the wire 16 so that when the temperature of the atmosphere surrounding the thermostat RT causes the thermostat HT to close the circuit to open the damper, the heat energized by the resistance ER, plus the rise in temperature of the surrounding atmosphere caused by the operation of the air conditioning device, will break the circuit to the draft regulator intermittently in order to maintain a uniform temperature within the space to be heated.

What I claim is:

1. An electrically operated heating, ventilating and cooling device for an air circulating system, including an air distributing unit connected to said system and mounting therein a motor-operated blower for circulating air through said unit into said system, a cooling coil above said blower connected to a motor-operated refrigeration unit, a steam radiator above said blower connected to a source of steam including a motor-operated steam valve for said radiator, and a manual control for selectively controlling the operation of the said motors, a motor-operated damper in the said air distributing unit above the steam radiators and air conditioning system, and wherein said manual control, when in position to operate the blower and open the steam valve, is adapted to close an additional circuit, and means in said additional circuit to automatically open and close said damper.

2. The structure of claim 1, including a motor-operated damper in the said air distributing unit above the steam radiator and air conditioning system, and wherein said manual control, when in position to operate the blower and open the steam valve, is adapted to close an additional circuit, and a three-wire room thermostat in said additional circuit adapted to control the damper motor to open and close the damper in response to changes in temperature of the air of the said system.

3. The structure of claim 1, including a two-wire room thermostat and wherein the said manual control, when in position to operate the blower and refrigeration unit closes a circuit to one side of said thermostat, the opening and closing of which circuit by the said thermostat controls the operation of the refrigeration unit independently of the manual control in response to changes in temperature of the air of the said system.

4. An electrically operated heating, ventilating and cooling device for an air circulating system, including an air distributing unit connected to said system and mounting therein a motor-operated blower for circulating air through said unit into said system, a cooling coil above said blower connected to a motor-operated refrigeration unit, a steam radiator above said blower connected to a source of steam including a motor-operated steam valve for said radiator, primary circuits for connecting said operating motors to a source of electricity, electrically operated switches in each of said circuits, a secondary circuit, a manual control including a plurality of switches in said secondary circuit for selectively operating said switches controlling the said primary circuits to operate the blower and open the steam valve, to operate the blower and close the steam valve, and to operate the blower, close the steam valve, and operate the refrigeration unit respectively.

5. The structure of claim 4, wherein a low pressure cut-out switch is interposed in the steam valve motor circuit responsive to steam pressure below a predetermined degree to close the steam valve independently of the circuits established by the manual control.

6. The structure of claim 4, wherein a high pressure cut-out switch is interposed in the refrigerating unit motor circuit responsive to pressure of the refrigerant above a predetermined degree to open the circuit to said motor independently of the circuits established by the manual switch.

7. The structure of claim 4, including a motor-operated damper in said air distributing unit above the steam radiator, and wherein said manual control, when in position to operate the blower and open the steam valve, is adapted to close an additional circuit, and a three-wire room thermostat in said additional circuit adapted to control the damper motor to open and close the damper in response to changes in temperature of the air of the said system.

HARVEY B. LAWTON.